United States Patent
Liu et al.

(10) Patent No.: US 10,929,725 B2
(45) Date of Patent: Feb. 23, 2021

(54) METHOD AND APPARATUS FOR PROCESSING INFORMATION

(71) Applicant: Beijing Baidu Netcom Science and Technology Co., Ltd., Beijing (CN)

(72) Inventors: Xiaobo Liu, Beijing (CN); Xuping Cao, Beijing (CN); Jialin Wu, Beijing (CN); Jigen Lv, Beijing (CN); Yingjie Shao, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 197 days.

(21) Appl. No.: 16/210,871

(22) Filed: Dec. 5, 2018

(65) Prior Publication Data
US 2019/0205708 A1 Jul. 4, 2019

(30) Foreign Application Priority Data
Dec. 28, 2017 (CN) .......................... 201711458159.8

(51) Int. Cl.
G06K 9/72 (2006.01)
G10L 13/08 (2013.01)
G06F 40/30 (2020.01)
G06F 40/284 (2020.01)

(52) U.S. Cl.
CPC .......... *G06K 9/726* (2013.01); *G06F 40/284* (2020.01); *G06F 40/30* (2020.01); *G10L 13/08* (2013.01)

(58) Field of Classification Search
None
See application file for complete search history.

(56) References Cited

U.S. PATENT DOCUMENTS

| | | | |
|---|---|---|---|
| 2011/0025842 A1* | 2/2011 | King | H04N 1/0036 348/135 |
| 2014/0168716 A1* | 6/2014 | King | G06K 9/00469 358/473 |
| 2017/0309003 A1* | 10/2017 | Bako | G06T 7/90 |
| 2018/0027206 A1* | 1/2018 | Li | G06F 3/04883 348/333.02 |
| 2018/0082154 A1* | 3/2018 | Kalyuzhny | G06K 9/18 |
| 2018/0137349 A1* | 5/2018 | Such | G06N 3/08 |
| 2019/0156162 A1* | 5/2019 | King | G06K 9/00483 |
| 2019/0188511 A1* | 6/2019 | Kalyuzhny | G06K 9/4604 |

* cited by examiner

*Primary Examiner* — Fayyaz Alam
(74) *Attorney, Agent, or Firm* — Nixon Peabody LLP

(57) ABSTRACT

A method and apparatus for processing information are provided. A specific embodiment of the method includes: acquiring image information containing text information, the text information comprising printed characters and non-printed characters; recognizing the text information is the image information to generate display data, the display data comprising a recognition result of the text information; and feeding back the display data to a user. This embodiment helps to reduce the limitations on the acquisition method and the contents of image information, and may enrich the feedback method and the contents of the text information therein.

15 Claims, 3 Drawing Sheets

METHOD AND APPARATUS FOR PROCESSING INFORMATION

CROSS-REFERENCE TO RELATED APPLICATIONS

This application claims priority to Chinese Patent Application no. 201711458159.8, filed in China on Dec. 28, 2017, the contents of which are incorporated herein by reference in their entirety.

TECHNICAL FIELD

Embodiments of the present disclosure relate to the field of computer technology, specifically to the field of character recognition technology, and more specifically to a method and apparatus for processing information.

BACKGROUND

OCR (optical character recognition) generally refers to the process of checking on characters printed on paper with an electronic device (such as a scanner or a digital camera), determining their shapes by detecting the dark and bright, and then translating the shapes into computer characters by a character recognition method.

SUMMARY

Embodiments of the present disclosure propose a method and apparatus for processing information.

In a first aspect, the embodiments of the present disclosure provide a method for processing information, including: acquiring image information containing text information, the text information including printed characters and non-printed characters; recognizing the text information in the image information to generate display data, the display data including a recognition result of the text information; and feeding back the display data to a user.

In some embodiments, the recognizing the text information in the image information to generate display data includes: recognizing the text information by using an optical character recognition method to generate a primary recognition result; and correcting an erroneous character in the primary recognition result through semantic analysis to generate the recognition result of the text information, to generate the display data.

In some embodiments, the feeding back the display data to a user includes: at least one of playing a speech of the recognition result of the text information, or presenting the display data.

In some embodiments, the playing a speech of the recognition result of the text information includes: performing speech synthesis on the recognition result of the text information to generate speech information containing background sound; and playing the speech information according to a first preset requirement, wherein the first preset requirement includes at least one of following requirements: a language, a speech rate, a tone, or a voice type.

In some embodiments, before the presenting the display data, the recognizing the text information in the image information to generate display data further includes: performing phonetic notation on the recognition result of the text information, to generate the display data.

In some embodiments, the presenting the display data includes: tokenizing the recognition result of the text information; and presenting the tokenized display data according to a second preset requirement, wherein the second preset requirement includes at least one of the following requirements: a background image, a font, a font size, or a color.

In some embodiments, the method further includes: determining whether there is a selection operation for current presented display data, in response to detecting a first operation instruction of the user to the current presented display data, wherein the selection operation includes at least one of the following: a selection of contents of a paragraph, the contents of a line, the contents of a single character, or the contents of a word of the display data; storing entire contents of the current display data in response to a determination result being no; and storing the contents of the display data selected by the selection operation in response to the determination result being yes, further determining whether the selection operation is the selection of the contents of the single character or the contents of the word, and presenting an annotation of the selected single character or word in response to the further determination result being yes.

In some embodiments, the method further includes: playing the speech of the recognition result of the text information repeatedly in response to detecting a second operation instruction of the user.

In a second aspect, the embodiments of the present disclosure provide an apparatus for processing information, including: an acquisition unit, configured to acquire image information containing text information, the text information including printed characters and non-printed characters; a recognition unit, configured to recognize the text information in the image information to generate display data, the display data including a recognition result of the text information; and a feeding back unit, configured to feed back the display data to a user.

In some embodiments, the recognition unit includes: a first generation subunit, configured to recognize the text information by using an optical character recognition method to generate a primary recognition result; and a second generation subunit, configured to correct an erroneous character in the primary recognition result through semantic analysis to generate the recognition result of the text information, to generate the display data.

In some embodiments, the feeding back unit is further configured to: at least one of play a speech of the recognition result of the text information, or present the display data.

In some embodiments, the feeding back unit includes: a synthesis subunit, configured to perform speech synthesis on the recognition result of the text information to generate speech information containing background sound; and a playing subunit, configured to play the speech information according to a first preset requirement, wherein the first preset requirement includes at least one of the following requirements: a language, a speech rate, a tone, or a voice type.

In some embodiments, the recognition unit is further configured to: perform phonetic notation on the recognition result of the text information, to generate the display data.

In some embodiments, the feeding back unit further includes: a processing subunit, configured to tokenize the recognition result of the text information; and a presenting subunit, configured to present the tokenized display data according to a second preset requirement, wherein the second preset requirement includes at least one of the following requirements: a background image, a font, a font size, or a color.

In some embodiments, the apparatus further includes: a first detection unit, configured to determine whether there is a selection operation for current presented display data, in response to detecting a first operation instruction of the user to the current presented display data, wherein the selection operation includes at least one of the following: a selection of contents of a paragraph, the contents of a line, the contents of a single character, or the contents of a word of the display data; a first storing unit, configured to store entire contents of the current display data in response to a determination result being no; and a second storing unit, configured to store the contents of the display data selected by the selection operation in response to the determination result being yes, further determine whether the selection operation is the selection of the contents of the single character or the contents of the word, and present an annotation of the selected single character or word in response to the further determination result being yes.

In some embodiments, the apparatus further includes: a second detection unit, configured to play the speech of the recognition result of the text information repeatedly in response to detecting a second operation instruction of the user.

In a third aspect, the embodiments of the present disclosure provide an electronic device, including: one or more processors; an image acquisition apparatus, for acquiring image information; a voice playing device, for playing speech information; a display screen, for presenting display data; and a storage apparatus, for storing one or more programs; the one or more programs, when executed by the one or more processors, cause the one or more processors to implement the method according to any one of the embodiments of the first aspect.

In a fourth aspect, the embodiments of the present disclosure provide a computer readable storage medium, storing a computer program thereon, the program, when executed by a processor, implements the method according to any one of the embodiments of the first aspect.

The method and apparatus for processing information provided by the embodiments of the present disclosure may acquire image information by various methods to recognize the text information contained therein. The text information may include printed characters and non-printed characters. This helps to reduce the limitations on the acquisition method and the contents of the text information. At the same time, display data including the recognition result of the text information may be generated, and the display data may be fed back to the user. This may enrich the feedback method and the feedback contents of the text information therein.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
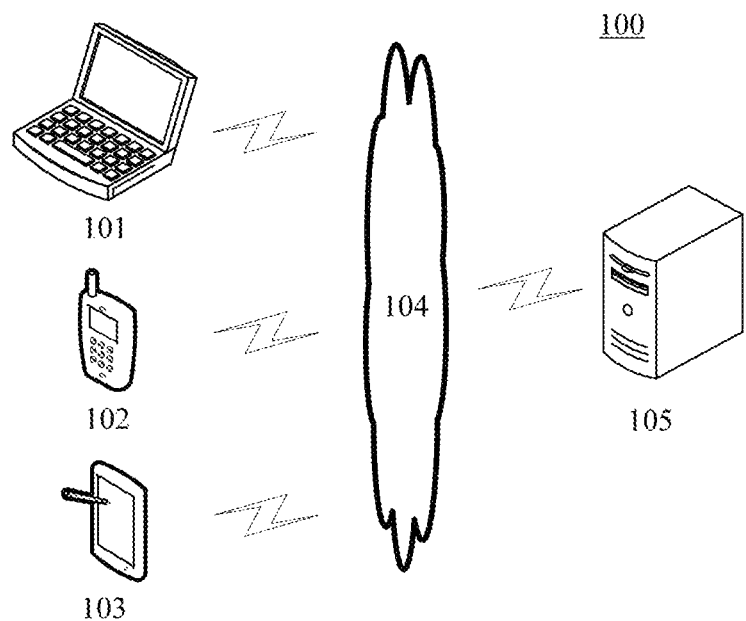
FIG. 1 is an exemplary system architecture diagram to which the present disclosure may be applied.

FIG. 1 shows an illustrative architecture of a system 100 which may be used by a method for processing information or an apparatus for processing information according to the embodiments of the present application.

As shown in FIG. 1, the system architecture 100 may include terminal devices 101, 102, and 103, a network 104 and a server 105. The network 104 serves as a medium providing a communication link between the terminal devices 101, 102, and 103, and the server 105. The network 104 may include various types of connections, such as wired or wireless transmission links, or optical fibers.

The user may use the terminal device 101, 102, or 103 to interact with the server 105 through the network 104, in order to transmit or receive messages, etc. Various communication client applications, such as webpage browser applications, text recognition applications, instant messaging tools, and shopping applications may be installed on the terminal devices 101, 102, and 103. In addition, the terminal devices 101, 102, and 103 may recognize and analyze the text information in the image information obtained by a user using the terminal devices, and feed back the analysis results (for example, the generated display data) to the user.

The terminal devices 101, 102, and 103 may be various electronic devices having one or more of an image acquision component (such as a camera), a voice playing component (such as a handset or a loadspeaker), or a display, including but not limited to, smart phones, tablet computers, e-book readers, laptop computers, and desktop computers.

The server 105 may be a server providing various services, for example, a back end server providing support to the applications on the terminal device 101, 102, or 103. The back end server may analyze the request instruction sent by the applications on the terminal device 101, 102, or 103, and return a processing result (for example, a response message corresponding to the request instruction, a deletion success message) to the terminal device 101, 102, or 103.

It should be noted that the method for processing information according to the embodiments of the present application is generally executed by the terminal device 101, 102, or 103. Accordingly, an apparatus for processing information is generally installed on the terminal device 101, 102, or 103.

It should be appreciated that the numbers of the terminal devices, the networks and the servers in FIG. 1 are merely illustrative. Any number of terminal devices, networks and servers may be provided based on the actual requirements.

Figure 2:
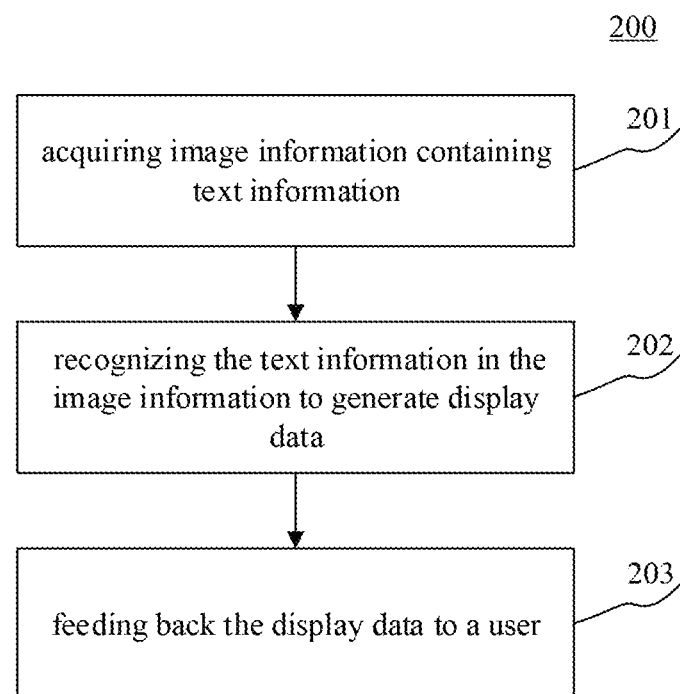
FIG. 2 is a flowchart of an embodiment of a method for processing information according to the present disclosure.

With further reference to FIG. 2, a flow 200 of an embodiment of the method for processing information according to the present disclosure is illustrated. The method for processing information includes the following steps:

Step 201, acquiring image information containing text information.

In the present embodiment, the electronic device (e.g., the terminal device 101, 102, or 103 as shown in FIG. 1) on which the method for processing information operate may acquire image information containing text information by various methods. For example, the electronic device may scan or take photos of the text information to obtain the image information by using an image acquisition apparatus (such as a camera) mounted thereon. For example, the electronic device may obtain the image information by performing screen capture processing on the text information displayed thereon. For example, the electronic device may acquire the image information from other devices communicatively connected thereto, such as image information sent by other devices through a chat tool. This makes it easy for users to obtain image information containing text information in various scenarios (such as online or offline).

In the present embodiment, the text information may include printed characters and non-printed characters. Here, the characters arranged on the graphic layout is usually referred to as "printed characters." The sizes and shapes of various printed characters are different, and are generally represented by size (or point) and font, for example, text information on paper media, billboards, and the like. The non-printed characters are usually characters other than the above-described printed characters, such as text information displayed on an electronic screen or handwritten text information. This may reduce the limitations of image information and help to improve the scope of application. In addition, the contents of the text information may include one or more characters of numbers, letters, symbols, Chinese characters, and the like.

Step 202, recognizing the text information in the image information to generate display data.

In the present embodiment, first, the electronic device may analyze the image information acquired in step 201 to determine the text information contained therein. Then, the electronic device may use a commonly used text recognition method to recognize the text information to generate display data. Here, the display data may include a recognition result of the text information.

In some alternative implementations of the present embodiment, first, the electronic device may recognize the text information by using an OCR (optical character recognition) method to generate a primary recognition result. Then, the electronic device may correct an erroneous character in the primary recognition result through semantic analysis (such as language environment, context, characters with similar forms, vocabulary dictionary, common language dictionary) to generate the recognition result of the text information, to generate the display data.

For example, the primary recognition result generated by the electronic device using the OCR method is "gentle push the door open." Then, the electronic device may determine "gentle" as an adjective and "push" as a verb based on the context and vocabulary dictionary. At this time, the electronic device may correct "gentle" to "gently." That is, the resulting recognition result is "gently push the door open." This helps to improve the accuracy of the recognition result.

Alternatively, after recognizing the text information to generate the recognition result, the electronic device may further perform phonetic notation on the recognition result to generate the display data. If the text information is in Chinese characters, the recognition result may be notated in pinyin. If the text information is in a foreign language (such as English), the recognition result may be notated in pronunciation. Here, the position and notation method of the phonetic notation are not limited in the present disclosure. For example, notation may be directly placed at the line spacing, or at a position above or below the corresponding text. For example, brackets may be added between characters, or at a position to the left or right of the corresponding text, and the notation is placed in the brackets.

Step 203, feeding back the display data to a user.

In the present embodiment, the electronic device may feed back the display data generated in step 202 to the user by a plurality of methods, enabling the user to know the text information in the image information.

In some alternative implementations of the present embodiment, the electronic device may play a speech of the recognition result of the text information, or present the display data, or both. That is to say, the electronic device may feedback the display data to the user in the form of reading aloud or displaying on the screen, or both.

Alternatively, if the speech of the recognition result of the text information is played, the electronic device may first adopt a common speech synthesis technology, such as TTS (text to speech), to perform speech synthesis on the recognition result of the text information, thereby generating speech information containing background sound. Here, the background sound may include, but is not limited to background music. The background sound may be set according to actual needs. Then, the electronic device may play the speech information according to a first preset requirement. Here, the first preset requirement may include, but is not limited to, at least one of the following requirements: language, speech rate, tone, or voice type. The voice type may include men, women, and children type. That is to say, the electronic device may play the speech of the generated speech information according to a preset language type, a speech rate, a tone, or a voice type. In addition, in some application scenarios, the user may also set a sound source (such as his own voice or the voice of a star) for playing the speech.

Further, if the display data is presented, the electronic device may first tokenize the recognition result of the text information. Then, the tokenized display data may be presented according to a second preset requirement. Here, the second preset requirement may include at least one of the following requirements: background image, font, font size, or color. Here, the background image is not limited in the present disclosure, which may be a static picture (such as a solid color image or a non-solid color image), or may be a dynamic image. That is to say, the electronic device may display the display data according to the setting requirements such as the font, the word size (font size), and the font color. This makes it easy for the user to clearly know the text information in the image information. Here, the Chinese tokenization, also known as the Chinese word segmentation, usually refers to the division of a Chinese character sequence into single words. Chinese tokenization is the basis of text mining. For a section of Chinese input, successful Chinese tokenization can help automatically recognize the meaning of the sentence by the computer. Tokenization technology has been widely used in the computer field and detailed description thereof will be omitted.

In addition, in some application scenarios, the electronic device may also determine whether there is a selection operation for current presented display data, in response to detecting a first operation instruction of the user to the current presented display data, wherein the selection operation may include at least one of the following: a selection of the contents of a paragraph, the contents of a line, the contents of a single character, or the contents of a word of the display data; store entire contents of the current display data in response to a determination result being no; and store the contents of the display data selected by the selection operation in response to the determination result being yes, further determine whether the selection operation is the selection of the contents of the single character or the contents of the word, and present an annotation of the selected single character or word in response to the further determination result being yes. Here, the annotation may include, but is not limited to, at least one of the following: the characteristic of a word, interpretation, usage, or examples, and the like.

Here, the first operation instruction may be an operation instruction for instructing storage of the display data. The first operation instruction may be triggered by the user by performing a specified operation on the electronic device, such as the user touching a preset area (such as a touch button) on the display screen of the electronic device or clicking a physical button on the electronic device. By storing and collecting the display data, it is convenient for the user to learn the contents of the collection anytime, anywhere.

It may be understood that the user may store and collect the entire contents of the display data, and may also store and collect the contents of a paragraph, the contents of several lines (several sentences), the contents of a single character, or the contents of a single word of the display data. For example, when the user directly performs an operation of triggering the first operation instruction, the electronic device may store the entire contents of the current display data. When the user performs the selection operation and then performs the operation of triggering the first operation instruction, the electronic device may store the contents of the display data selected by the selection operation. Here, the appearance of the selection operation is not limited in the present disclosure, such as changing the background color, font, font size, or color of the contents of the selected display data.

It should be noted that for the selection of a single character, the user may implement the selection by selecting the recognition result (text) or the phonetic notation. For the selection of a word, since the electronic device has previously tokenized the recognition result, the user may implement the selection by selecting the recognition result or the phonetic notation of any character in the word. In addition, there is no limitation on how and where the notation is presented.

Further, in order to facilitate the user to use and operate, the electronic device may play the speech of the recognition result of the text information repeatedly in response to detecting a second operation instruction of the user. The number of times of repeated playing may be at least once. Here, the second operation instruction may be an operation instruction for indicating playing the speech of the recognition result of the text information. The second operation instruction may also be triggered by the user by performing a specified operation on the electronic device, and detailed description thereof will be omitted.

In addition, in order to further improve the convenience of use, when the electronic device detects the second operation instruction once again, the electronic device may interrupt or terminate the voice playing. After that, when the electronic device detects the second operation instruction again, the electronic device may continue or restart voice playing.

The method for processing information provided by the present, embodiment may acquire image information by various methods to recognize the text information contained therein. The text information may include printed characters and non-printed characters. This helps to reduce the limitations on the acquisition method and the contents of the text information. At the same time, display data including the recognition result of the text information may be generated, and the display data may be fed back to the user. This may enrich the feedback method and the feedback contents of the text information therein.

Figure 3A:
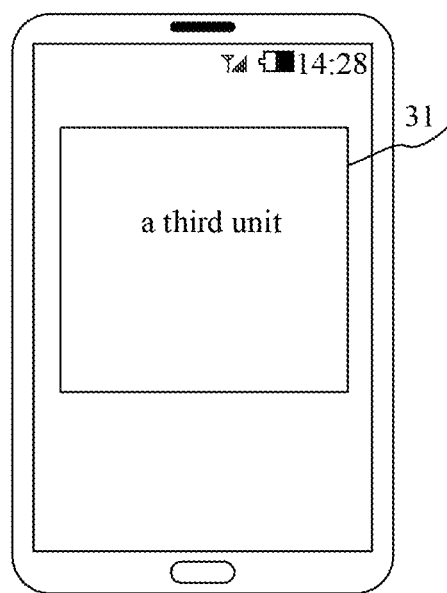
FIGS. 3A-3B are schematic diagrams of an application scenario of the method for processing information according to the present disclosure.
Figure 3B:
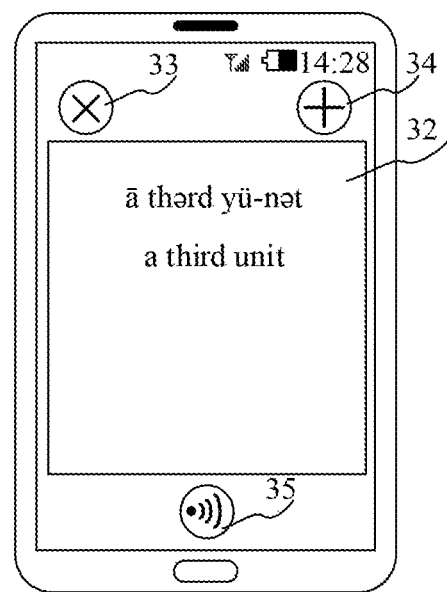

With further reference to FIGS. 3A-3B, FIGS. 3A-3B are schematic diagrams of an application scenario of the method for processing information according to the present embodiment.

In the application scenario of FIG. 3A, a user (such as an illiterate, a semi-literate, a vision impaired person, or a child) may use the camera on the terminal to take pictures of the text information on the book, thereby obtaining image information 31 on the display screen of the terminal.

In the application scenario of FIG. 3B, after acquiring the image information 31, the terminal may recognize the text information therein, then generate display data 32, and present the display data 32 in words on the display screen. The display data 32 includes both the recognition result (a third unit) of the text information and the phonetic notation (a thərd yü-nə t) of the recognition result. Here, the phonetic notation may also contain a phonetic symbol. In addition, the display screen may also present a turnoff icon 33, a collection icon 34 and a play icon 35.

While presenting the display data 32, the terminal may also play the speech of the recognition result, thereby reading aloud the text information in the image information 31 to the user. In addition, the terminal may present the playback progress on the display screen while playing the speech. The specific presentation method is not limited in the present disclosure, such as changing the background color, font, font size, or color of the played contents, or displaying a marking line.

In this way, whether for the text displayed on the terminal (i.e., an online scene) or the text seen in daily life (i.e., an offline scene), the user may use the terminal to perform a simple operation to acquire the image information containing the text, thereby acknowledging the contents of the text. For different people, feedback may be performed in a variety of methods, so that the applicability is enhanced. In this way, a variety of functions are integrated, and the operation is convenient and easy to learn, which help the operation and use of different groups of people.

Figure 4:
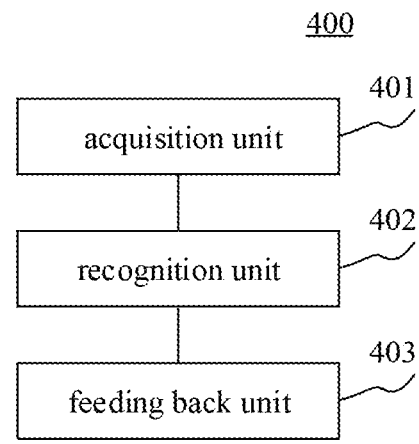
FIG. 4 is a schematic structural diagram of an embodiment of an apparatus for processing information according to the present disclosure.

With further reference to FIG. 4, as an implementation to the method shown in the above figures, the present disclosure provides an embodiment of an apparatus for processing information. The apparatus embodiment corresponds to the method embodiment shown in FIG. 2, and the apparatus may specifically be applied to various electronic devices.

As shown in FIG. 4, the apparatus 400 for processing information of the present embodiment may include: an acquisition unit 401, configured to acquire image information containing text information, the text information including printed characters and non-printed characters; a recognition unit 402, configured to recognize the text information in the image information to generate display data, the display data including a recognition result of the text information; and a feeding back unit 403, configured to feed back the display data to a user.

In the present embodiment, the specific implementations and the related beneficial effects of the acquisition unit 401, the recognition unit 402, and the feeding back unit 403 may be referred to the related descriptions of step 201, step 202, and step 203 in the embodiment as shown in FIG. 2, respectively, detailed description thereof will be omitted.

In some alternative implementations of the present embodiment, the recognition unit 402 may include: a first generation subunit (not shown in the figure), configured to recognize the text information by using an optical character recognition method to generate a primary recognition result; and a second generation subunit (not shown in the figure), configured to correct an erroneous character in the primary recognition result through semantic analysis to generate the recognition result of the text information, to generate the display data.

Alternatively, the feeding back unit 403 may be further configured to: at least one of play a speech of the recognition result of the text information, or present the display data.

Further, the feeding back unit 403 may include: a synthesis subunit (not shown in the figure), configured to perform speech synthesis on the recognition result of the text information to generate speech information containing background sound; and a playing subunit (not shown in the figure), configured to play the speech information according to a first preset requirement, wherein the first preset requirement includes at least one of the following requirements: a language, a speech rate, a tone, or a voice type.

In some embodiments, the recognition unit 402 may be further configured to: perform phonetic notation on the recognition result of the text information, to generate the display data.

Alternatively, the feeding back unit 403 may further include: a processing subunit (not shown in the figure), configured to tokenize the recognition result of the text information; and a presenting subunit (not shown in the figure) configured to present the tokenized display data according to a second preset requirement, wherein the second preset requirement includes at least one of the following requirements: a background image, a font, a font size, or a color.

In some application scenarios, the apparatus 400 may further include: a first detection unit (not shown in the figure), configured to determine whether there is a selection operation for current presented display data, in response to detecting a first operation instruction of the user to the current presented display data, wherein the selection operation includes at least one of the following: a selection of contents of a paragraph, the contents of a line, the contents of a single character, or the contents of a word of the display data; a first storing unit (not shown in the figure), configured to store entire contents of the current display data in response to a determination result being no; and a second storing unit (not shown in the figure), configured to store the contents of the display data selected by the selection operation in response to the determination result being yes, further determine whether the selection operation is the selection of the contents of the single character or the contents of the word, and present an annotation of the selected single character or word in response to the further determination result being yes.

Alternatively, the apparatus 400 may further include: a second detection unit (not shown in the figure), configured to play the speech of the recognition result of the text information repeatedly in response to detecting a second operation instruction of the user.

Figure 5:
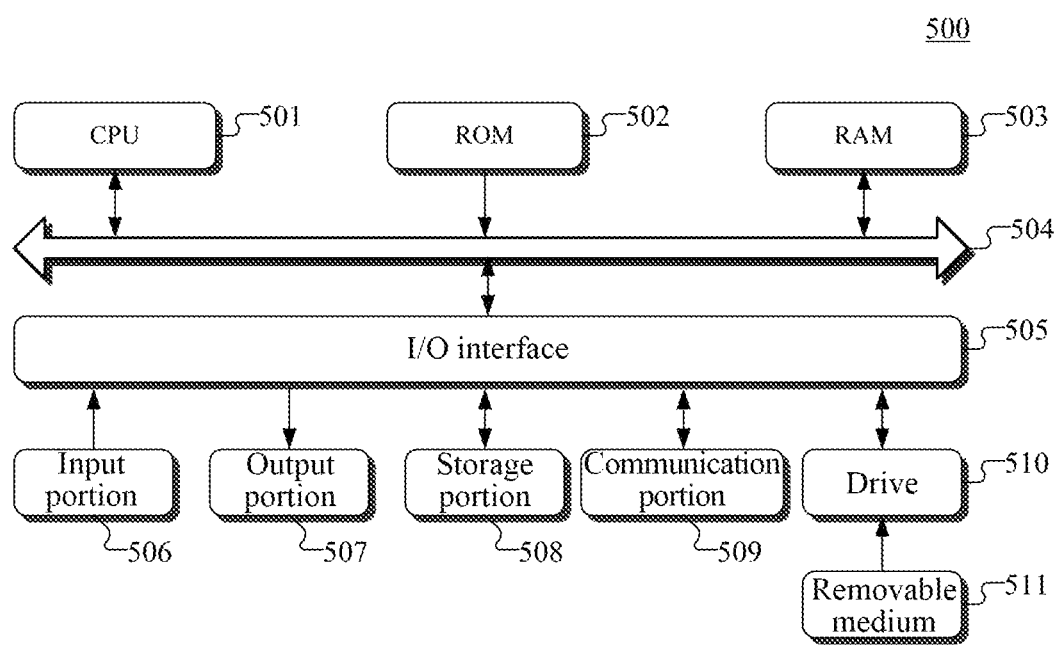
FIG. 5 is a schematic structural diagram of a computer system adapted to implement an electronic device of the embodiments of the present disclosure.

Referring to FIG. 5, a schematic structural diagram of a computer system 500 adapted to implement a terminal device or a server of the embodiments of the present application is shown. The driving control device shown in FIG. 5 is merely an example and should not impose any restriction on the function and scope of use of the embodiments of the present application.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A drive 510 is also connected to the I/O interface 505 as required. A removable medium 511, such as a magnetic disk, an optical disk, a magneto-optical disk, and a semiconductor memory, may be installed on the drive 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure. It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising an acquisition unit, a recognition unit, and a feeding back unit, where the names of these units or modules do not in some cases constitute a limitation to such units or modules themselves. For example, the acquisition unit may also be described as "a unit for acquiring image information containing text information."

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: acquire image information containing text information, the text information comprising printed characters and non-printed characters; recognize the text information in the image information to generate display data, the display data comprising a recognition result of the text information; and feed back the display data to a user.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for processing information, the method comprising:
    acquiring image information containing text information, the text information comprising printed characters and non-printed characters;
    recognizing the text information in the image information to generate display data, comprising: recognizing the text information by using an optical character recognition method to generate a primary recognition result, correcting an erroneous character in the primary recognition result through semantic analysis to generate a recognition result of the text information, and generating the display data comprising the recognition result of the text information; and
    feeding back the generated display data comprising the recognition result of the text information to a user.

2. The method according to claim 1, wherein the feeding back the display data to a user comprises:
    at least one of playing a speech of the recognition result of the text information, or presenting the display data.

3. The method according to claim 2, wherein the playing a speech of the recognition result of the text information comprises:
    performing speech synthesis on the recognition result of the text information to generate speech information containing background sound; and
    playing the speech information according to a first preset requirement, wherein the first preset requirement comprises at least one of following requirements: a language, a speech rate, a tone, or a voice type.

4. The method according to claim 2, wherein before the presenting the display data, the recognizing the text information in the image information to generate display data further comprises:
    performing phonetic notation on the recognition result of the text information, to generate the display data.

5. The method according to claim 2, wherein the presenting the display data comprises:
    tokenizing the recognition result of the text information; and
    presenting the tokenized display data according to a second preset requirement, wherein the second preset requirement comprises at least one of following requirements: a background image, a font, a font size, or a color.

6. The method according to claim 5, wherein the method further comprises:
    determining whether there is a selection operation for current presented display data, in response to detecting a first operation instruction of the user to the current presented display data, wherein the selection operation comprises at least one of: a selection of contents of a paragraph, the contents of a line, the contents of a single character, or the contents of a word of the display data;
    storing entire contents of the current display data in response to a determination result being no; and
    storing the contents of the display data selected by the selection operation in response to the determination result being yes, further determining whether the selection operation is the selection of the contents of the single character or the contents of the word, and presenting an annotation of the selected single character or word in response to the further determination result being yes.

7. The method according to claim 2, wherein the method further comprises:

playing the speech of the recognition result of the text information repeatedly in response to detecting a second operation instruction of the user.

8. An apparatus for processing information, the apparatus comprising:
   at least one processor; and
   a memory storing instructions, the instructions when executed by the at least one processor, cause the at least one processor to perform operations, the operations comprising:
   acquiring image information containing text information, the text information comprising printed characters and non-printed characters;
   recognizing the text information in the image information to generate display data, comprising: recognizing the text information by using an optical character recognition method to generate a primary recognition result, correcting an erroneous character in the primary recognition result through semantic analysis to generate a recognition result of the text information, and generating the display data comprising the recognition result of the text information; and
   feeding back the generated display data comprising the recognition result of the text information to a user.

9. The apparatus according to claim 8, wherein the feeding back the display data to a user comprises:
   at least one of playing a speech of the recognition result of the text information, or presenting the display data.

10. The apparatus according to claim 9, wherein the playing a speech of the recognition result of the text information comprises:
    performing speech synthesis on the recognition result of the text information to generate speech information containing background sound; and
    playing the speech information according to a first preset requirement, wherein the first preset requirement comprises at least one of following requirements: a language, a speech rate, a tone, or a voice type.

11. The apparatus according to claim 9, wherein before the presenting the display data, the recognizing the text information in the image information to generate display data further comprises:
    performing phonetic notation on the recognition result of the text information, to generate the display data.

12. The apparatus according to claim 9, wherein the presenting the display data comprises:
    tokenizing the recognition result of the text information; and
    presenting the tokenized display data according to a second preset requirement, wherein the second preset requirement comprises at least one of following requirements: a background image, a font, a font size, or a color.

13. The apparatus according to claim 12, wherein the operations further comprise:
    determining whether there is a selection operation for current presented display data, in response to detecting a first operation instruction of the user to the current presented display data, wherein the selection operation comprises at least one of: a selection of contents of a paragraph, the contents of a line, the contents of a single character, or the contents of a word of the display data;
    storing entire contents of the current display data in response to a determination result being no; and
    storing the contents of the display data selected by the selection operation in response to the determination result being yes, further determining whether the selection operation is the selection of the contents of the single character or the contents of the word, and presenting an annotation of the selected single character or word in response to the further determination result being yes.

14. The apparatus according to claim 9, wherein the operations further comprise:
    playing the speech of the recognition result of the text information repeatedly in response to detecting a second operation instruction of the user.

15. A non-transitory computer-readable storage medium storing a computer program, the computer program when executed by one or more processors, causes the one or more processors to perform operations, the operations comprising:
    acquiring image information containing text information, the text information comprising printed characters and non-printed characters;
    recognizing the text information in the image information to generate display data, comprising: recognizing the text information by using an optical character recognition method to generate a primary recognition result, correcting an erroneous character in the primary recognition result through semantic analysis to generate a recognition result of the text information, and generating the display data comprising the recognition result of the text information; and
    feeding back the generated display data comprising the recognition result of the text information to a user.

* * * * *